US012682909B1

(12) United States Patent
Chong et al.

(10) Patent No.: US 12,682,909 B1
(45) Date of Patent: Jul. 14, 2026

(54) MACHINE LEARNING BASED AUDIO WATERMARKING FOR VIDEOCONFERENCING

(71) Applicant: Zoom Video Communications, Inc., San Jose, CA (US)

(72) Inventors: Dading Chong, Hangzhou (CN); Dongyang Dai, Shanghai (CN); Yuzong Liu, Bothell, WA (US); Chao Wang, Yancheng (CN); Tao Wang, Anhui (CN)

(73) Assignee: Zoom Communications, Inc., San Jose, CA (US)

( * ) Notice: Subject to any disclaimer, the term of this patent is extended or adjusted under 35 U.S.C. 154(b) by 271 days.

(21) Appl. No.: 18/411,624

(22) Filed: Jan. 12, 2024

(51) Int. Cl.
*G10L 19/018* (2013.01)
*G10L 19/038* (2013.01)
*G10L 25/51* (2013.01)

(52) U.S. Cl.
CPC .......... *G10L 19/018* (2013.01); *G10L 19/038* (2013.01); *G10L 25/51* (2013.01)

(58) Field of Classification Search
CPC .............................. G10L 19/018; G10L 25/51
See application file for complete search history.

(56) References Cited

U.S. PATENT DOCUMENTS

2014/0016814 A1* 1/2014 Baughman .............. G06F 21/16 382/100
2021/0050025 A1* 2/2021 Huffman ................ G06N 3/088
2024/0086759 A1* 3/2024 Sharma .................... G10L 15/16
2024/0394827 A1* 11/2024 Guo .................. H04N 1/32235

* cited by examiner

*Primary Examiner* — Bryan S Blankenagel
(74) *Attorney, Agent, or Firm* — Kilpatrick Townsend & Stockton, LLP

(57) ABSTRACT

Systems and methods for machine learning based audio watermarking for videoconferencing are provided. For example, a computing device accesses an original audio signal and a watermark to be embedded into the original audio signal and extracts, using an audio encoder, a set of audio features from the original audio signal. The audio encoder is a machine learning model. The computing device further extracts, using a watermark encoder, a set of watermark features from the watermark. The watermark encoder is also a machine learning model. The computing device combines the set of audio features and the set of watermark features to generate a set of features, compresses the set of features, and transmits the compressed set of features.

20 Claims, 9 Drawing Sheets

MACHINE LEARNING BASED AUDIO WATERMARKING FOR VIDEOCONFERENCING

FIELD

The present application generally relates to videoconferencing, and more particularly relates to machine learning based audio watermarking for videoconferencing.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
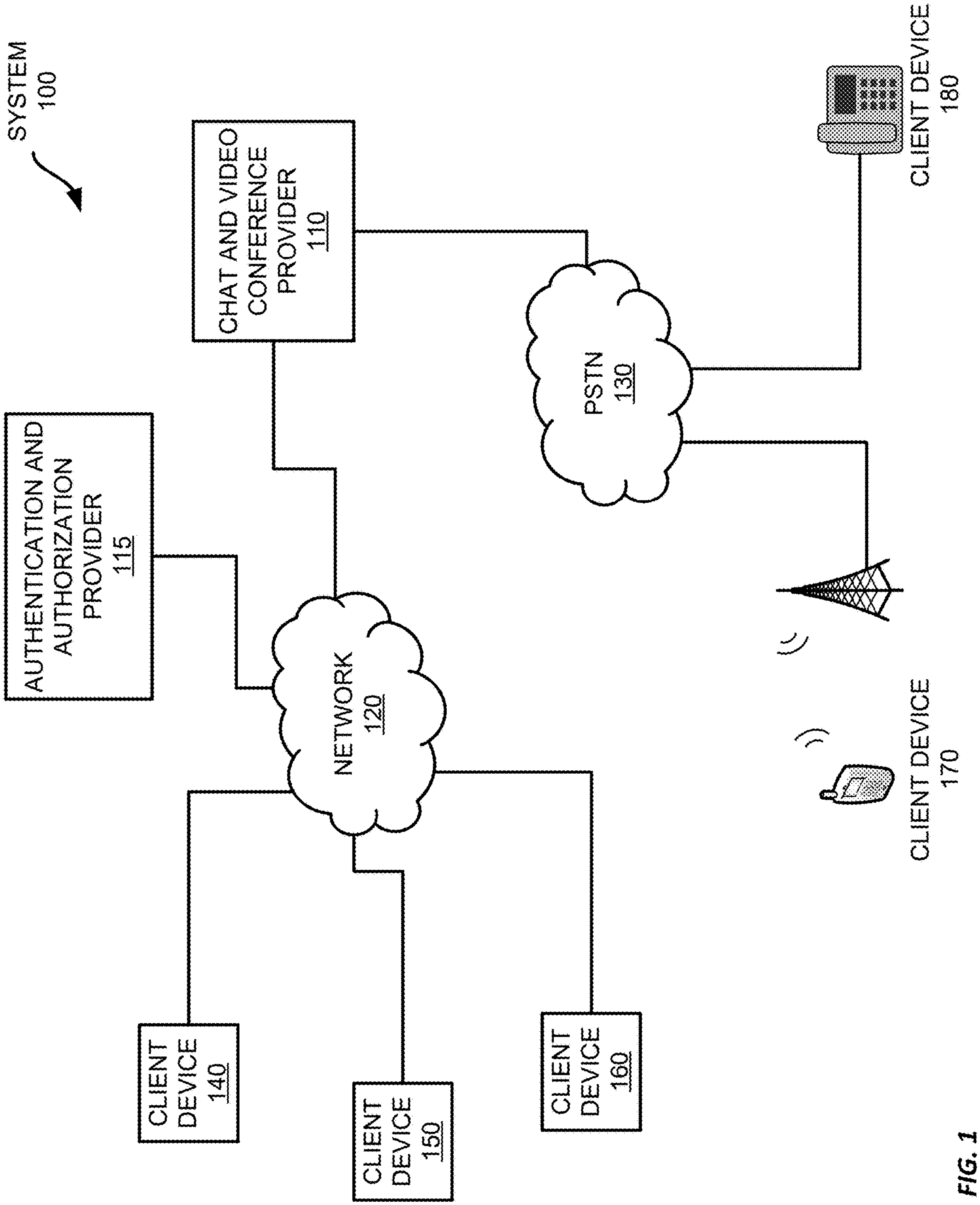
FIG. 1 shows an example system that provides videoconferencing functionality to various client devices, according to certain aspects described herein.

Examples are described herein in the context of systems and methods for machine learning based audio watermarking for videoconferencing. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

In the video-conferencing platform, audio signals are exchanged between participants' client devices. These audio signals may be redistributed to other entities, with or without authorization. To prevent unauthorized redistribution of the audio signals of the meeting, watermarks may be embedded into the meeting audio signals. If an unauthorized copy of the meeting audio signal is discovered, the watermark can be extracted and used to identify the source of the leak. Similarly, watermarks can be embedded into the audio signals for other applications, such as copyright protection, content authentication, ownership verification, and so on.

However, traditional audio watermarking approaches, such as those relying on acoustic models, either introduce perceptible distortions or artifacts in the watermarked audio or lead to insufficient amount of watermark to be embedded due to the inaccuracy of the acoustic models. This diminishes the overall listening experience for users or the effectiveness of the watermarking approaches.

To solve the above problems, example systems and methods for machine learning based audio watermarking for videoconferencing are provided. As described herein, the audio watermarking system can include multiple machine learning models, such as an audio encoder, a watermark encoder, an audio decoder, and a watermark extractor. The audio encoder is configured to encode an original audio signal into a set of audio features and the watermark encoder is configured to encode a watermark into a set of watermark features. The audio features and the watermark features can be combined to generate the features for the watermarked audio signal. The combination can be performed by concatenation, summation, averaging, and so on. The audio decoder is configured to decode the features of the watermarked audio signal into the watermarked audio signal. The watermark extractor is configured to extract the watermark from the watermarked audio signal. Each of these machine learning models can be a neural network model.

The training of the machine learning models can be performed by adjusting the parameters of these models to minimize a loss function. The loss function can include a term representing the difference between the original audio signal and the watermarked audio signal to ensure the watermarked audio signal is perceptibly similar to the original audio signal. The loss function can also include a term representing the difference between the watermark and the reconstructed watermark to ensure the reconstructed watermark is similar to the embedded watermark thereby to ensure the robustness (detectability or recoverability) of the watermark. The loss function may further include a term representing a generative adversarial loss defined based on the original audio signal and the watermarked audio signal to further improve the perceptual quality of the watermarked signal. By minimizing the loss function, the machine learning models are trained to achieve both the imperceptibility and the robustness of the embedded watermark.

The trained machine learning models can be deployed to various devices for audio watermark embedding, watermarked audio signal reconstruction, and watermark extraction. For example, the audio encoder and the watermark encoder can be deployed to client devices associated with participants of a video conference to embed watermarks into audio signals. Likewise, the audio decoder can also be deployed to individual client devices to generate watermarked audio signals. For example, a client device associated with a participant can encode the audio signal captured at the client device into audio features using the audio encoder and encode a watermark into watermark features using the watermark encoder. The audio features and the watermark features can be combined to generate features of the watermarked audio signal. The combined features of the watermarked audio signal can be transmitted to other participants of the video conference. To facilitate the transmission, the features of the watermarked audio signal can also be compressed, such as quantized, or otherwise processed to reduce the size before transmission.

The receiving client device can decompress the received features of the watermarked audio signal and use the audio decoder to reconstruct watermarked audio signal using the audio decoder. The reconstructed watermarked audio signal can be played at the receiving client device. Similarly, original audio signals captured at the receiving client device can be processed as described above to add watermarks and transmitted to other devices.

If the watermarks need to be extracted for verification, for example when an unauthorized copy of an audio signal is detected, a computing device, such as a provider of the video conference, can utilize the watermark extractor to extract the watermark from the unauthorized copy of audio signal. The extracted watermark can be examined, for example, to determine the source of the leak. Other types of watermarks can be embedded and extracted for other purposes, such as copyright protection, content authentication, ownership verification, and so on.

As described herein, certain embodiments provide improvements to audio watermarking by leveraging machine learning techniques to imperceptibly and robustly embed watermarks into audio signals. Through training, the machine learning based audio watermarking described herein allows the watermarks to be embedded without causing noticeable artifacts to the audio signal and without wasting the embedding capacity of the audio signal. Machine learning models, such as neural networks, can learn complex mappings to hide watermarks while preserving imperceptibility. Autoencoder architectures allow embedding watermarks in a latent space while recovering the original audio. Adversarial training improves perceptual quality. As a result, the audio quality of watermarked audio is improved while the retrievability of the watermark is increased based on the machine learning models.

This illustrative example is given to introduce the reader to the general subject matter discussed herein and the disclosure is not limited to this example. The following sections describe various additional non-limiting examples and examples of systems and methods for machine learning based audio watermarking for videoconferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
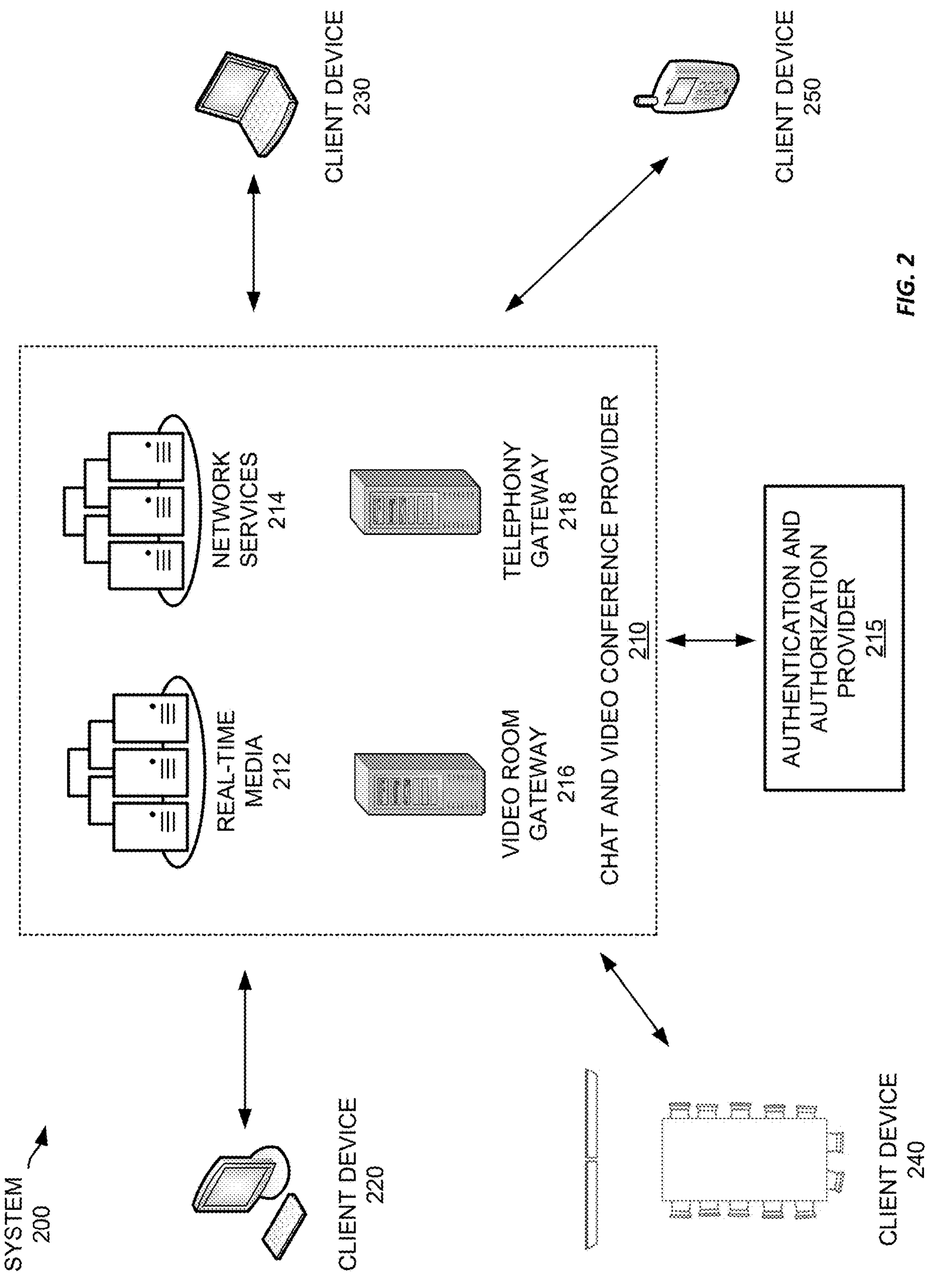
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating speech transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples according to the present disclosure, a user may select an option to use one or more optional AI features available from the virtual conference provider. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, the goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default account owners and administrators control whether to enable these AI features for their accounts, and if enabled, individual users may determine whether to provide consent to use their personal information.

Figure 3:
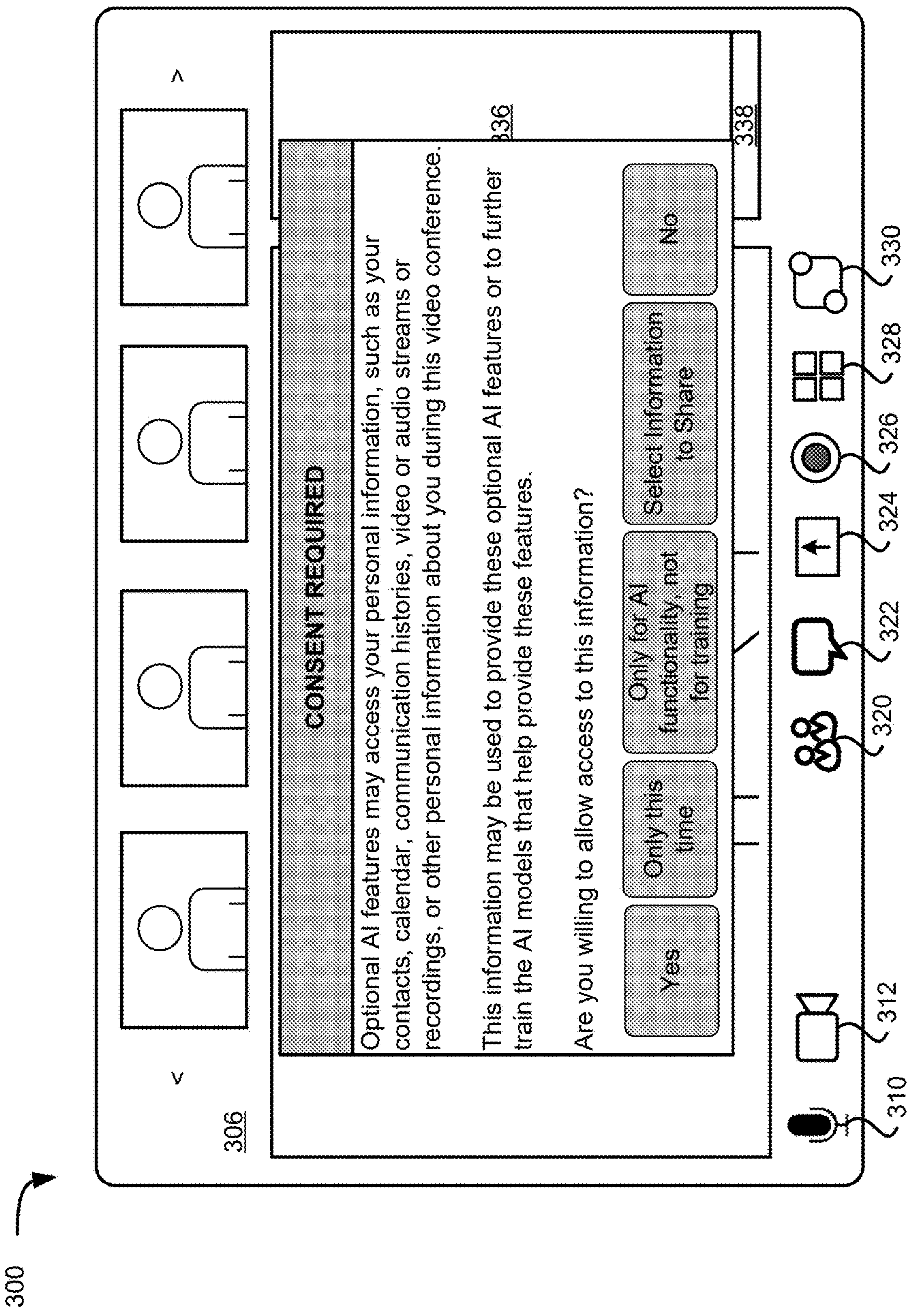
FIG. 3 shows an example of a user interface configured to display a consent authorization window for a user who has engaged in a video conference to interact with and to select options to use an available optional AI feature, according to certain aspects of the present disclosure.

As can be seen in FIG. 3, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 4:
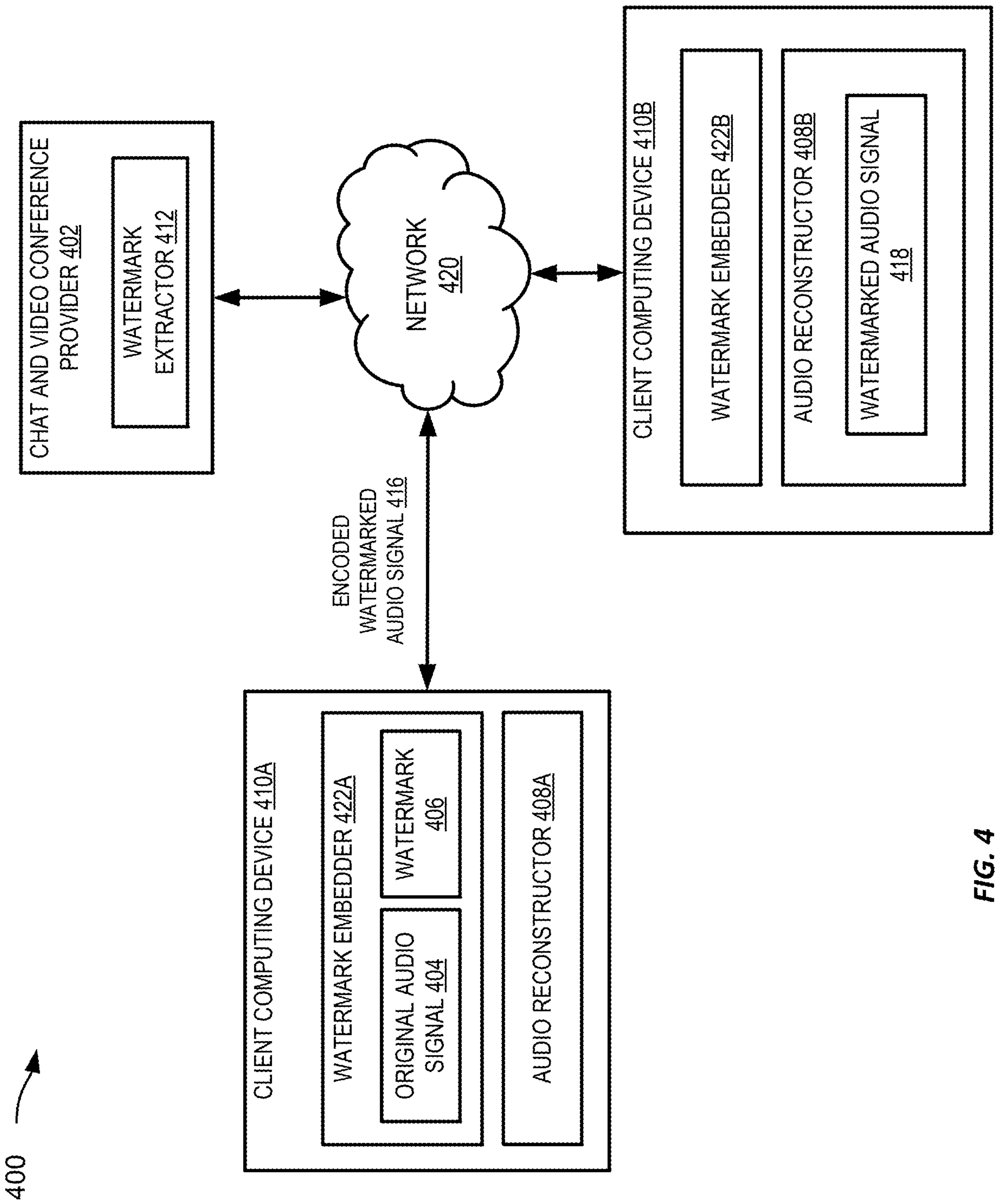
FIG. 4 shows an example of an operating environment for machine learning based audio watermarking for videoconferencing, according to certain aspects described herein.

Referring now to FIG. 4, FIG. 4 shows an example of an operating environment 400 for machine learning based audio watermarking for videoconferencing, according to certain aspects described herein. The operating environment 400 includes a chat and video conference provider 402 configured to host and provide various functionalities of video conferences, such as the chat and video conference provider 110 and the chat and video conference provider 210 described above with respect to FIGS. 1 and 2, respectively. For example, the chat and video conference provider 402 is configured to host and deliver videoconferencing streams to client computing devices 410A and 410B (which may be referred to herein individually as a client computing device 410 or collectively as the client computing devices 410). The video conferencing streams can include video signals of the participants, audio signals captured at respective client computing devices associated with the participants (e.g., encoded watermarked audio signal 416), and other signals or streams regarding the participants. The client computing devices 410 may be the client devices 140-180 and 220-250 discussed above with respect to FIGS. 1 and 2.

Each of the client computing devices 410 is configured with a watermark embedder 422 and an audio reconstructor 408. The watermark embedder 422 can be used to embed watermark into original audio signal captured at the client computing device 410. The audio signal with embedded watermark can be transmitted over the network 420 to other client computing devices 410 associated with other participants of the video conference, where the receiving client computing device 410 can use an audio reconstructor 408 to reconstruct the watermarked audio signal in the temporal domain for playing.

For example, the client computing device 410A associated with a participant can encode the original audio signal 404 captured at the client computing device 410A into audio features and encode a watermark 406 into watermark features using the watermark embedder 422A. The audio features and the watermark features can be combined to generate features of the watermarked audio signal. These features may be compressed, such as quantized, or otherwise processed to reduce the size to generate encoded watermarked audio signal 416. The encoded watermarked audio signal 416 can be transmitted to other client computing devices, such as the client computing device 410B. The client computing device 410B can reconstruct watermarked audio signal 418 in the temporal domain from the received encoded watermarked audio signal 416 using the audio reconstructor 408B. The reconstructed watermarked audio signal can be played at the client computing device 410B.

If the watermarks need to be extracted for verification, for example when an unauthorized copy of an audio signal is detected, a computing device, such as the chat and video conference provider 402 can utilize the watermark extractor 412 to extract the watermark from the unauthorized copy of audio signal. The extracted watermark can be examined, for example, to determine the source of the leak. Other types of watermarks can be embedded and extracted for other purposes, such as copyright protection, content authentication, ownership verification, and so on. Additional details regarding training and using the various models to embed and extract watermarks from audio signals are provided below with respect to FIGS. 5-8.

While in the example shown in FIG. 4, the watermark extractor 412 is installed on the chat and video conference provider 402, it can be installed in other computing devices where the watermark needs to be extracted. In addition, the watermark embedder 422 may also be installed on the chat and video conference provider 402 to allow additional watermarks to be added to the audio signals handled by the chat and video conference provider 402. Other implementations may also be possible.

Figure 5:
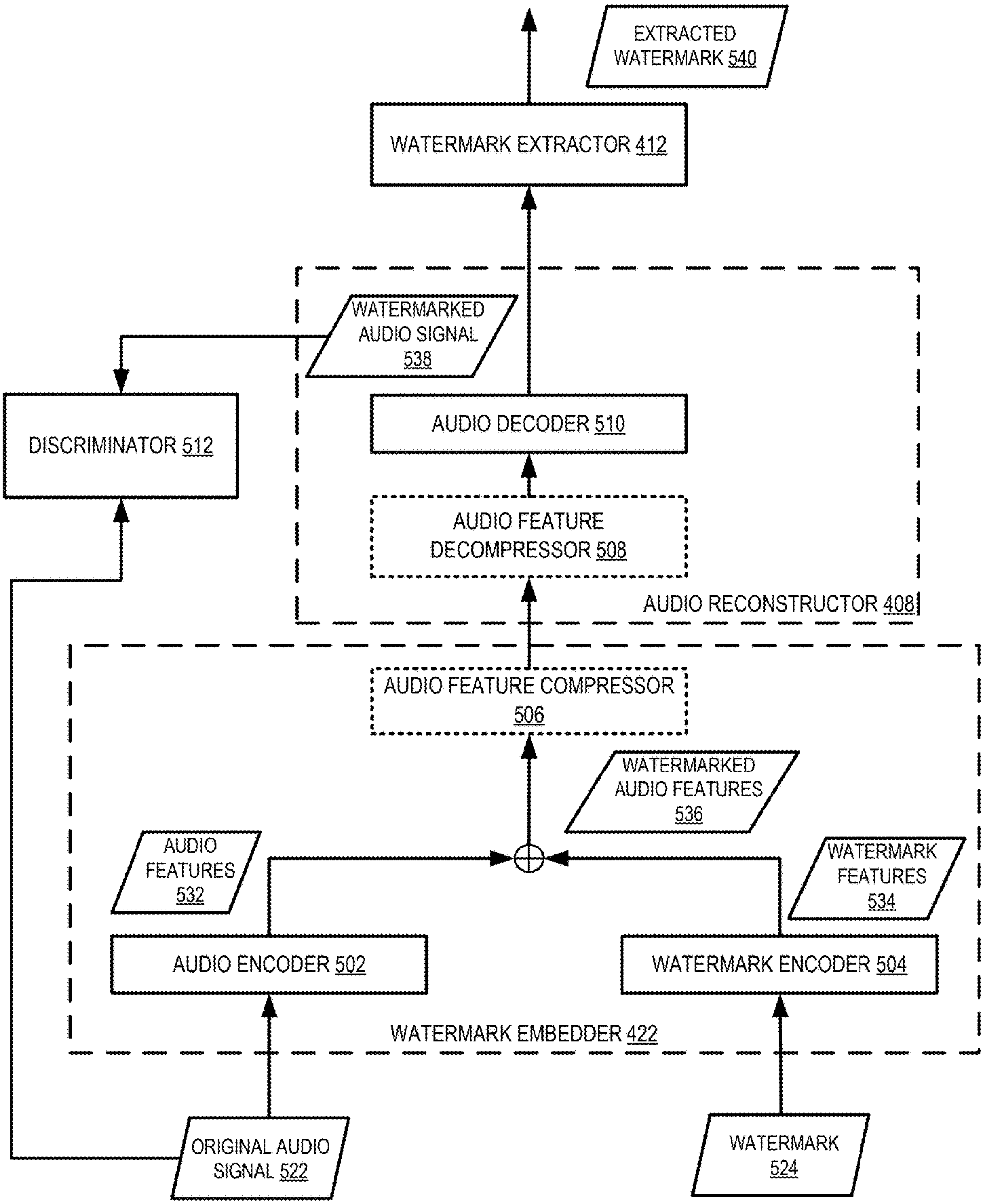
FIG. 5 shows a block diagram of the machine learning models involved in the machine learning based audio watermarking for videoconferencing, according to certain aspects of the present disclosure.

Referring now to FIG. 5, FIG. 5 shows a block diagram of the models involved in the machine learning based audio watermarking for videoconferencing, according to certain aspects of the present disclosure. As shown in FIG. 5, the watermark embedder 422 includes an audio encoder 502 and a watermark encoder 504. The audio encoder 502 is configured to encode an original audio signal 522 into audio features 532. The watermark encoder 504 is configured to encode a watermark 524 into watermark features 534. The audio features 532 and the watermark features 534 can be combined to generate the features for the watermarked audio signal, referred to as watermarked audio features 536. The combination can be performed by concatenation, summation, averaging, and so on.

In some examples, the audio encoder 502 includes a multi-layer convolutional neural network (CNN), where each CNN layer is followed by a rectified linear unit (ReLU) activation function and a normalization layer. This configuration allows the audio features to be efficiently encoded and extracted. The watermark encoder 504 also includes a multi-layer CNN network but with fewer layers, with each CNN layer followed by a ReLU activation function and a normalization layer.

Figure 6:
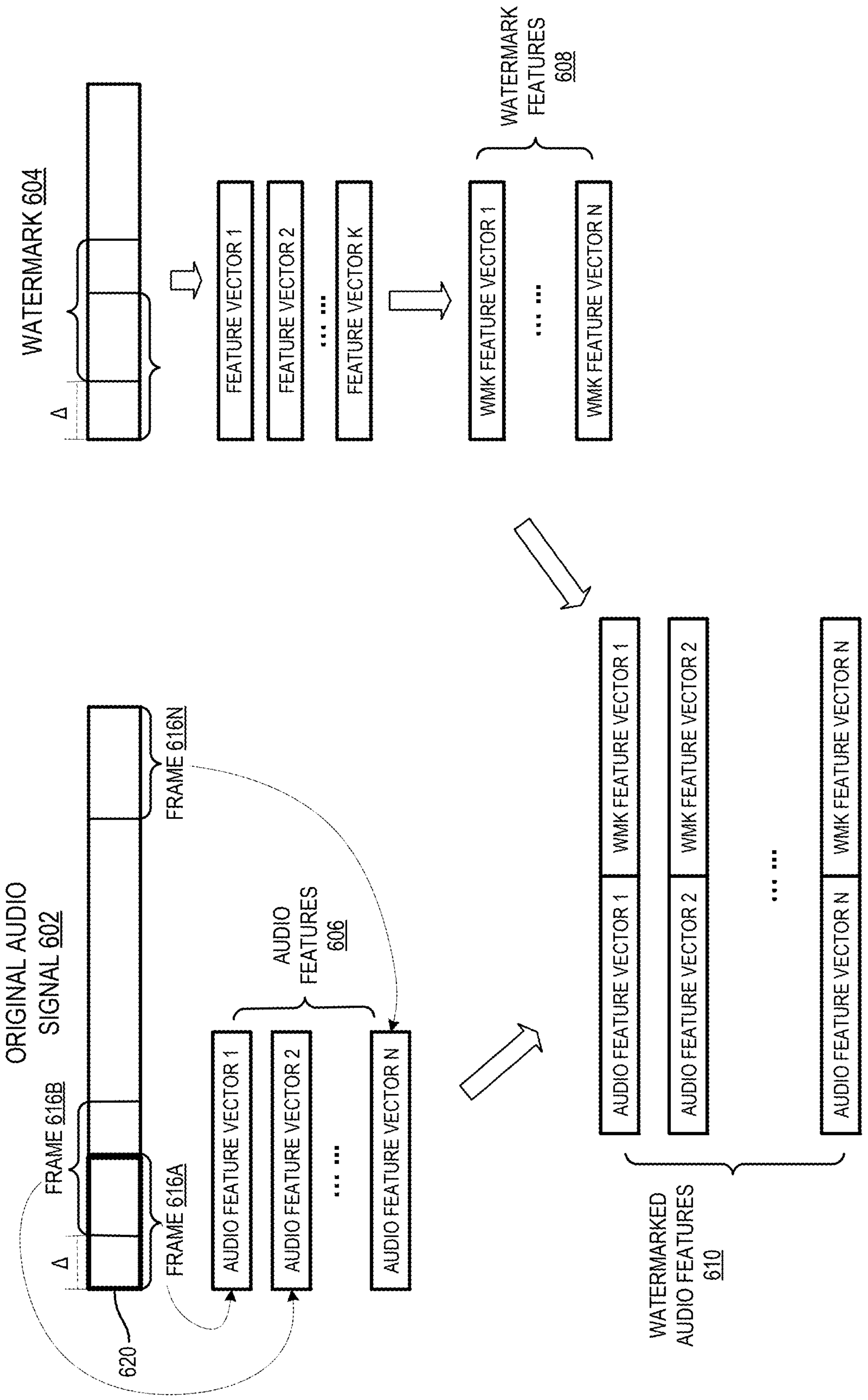
FIG. 6 shows an example of generating watermarked audio features for audio watermark embedding, according to certain aspects of the present disclosure.

FIG. 6 shows an example of generating the audio features 532 and the watermark features 534 as well as the watermarked audio features 536. In the example shown in FIG. 6, the audio features are generated for each frame identified in the original audio signal 602. For example, a sliding window 620 can be applied to the original audio signal 602 to extract one frame 616A. The sliding window 620 can be shifted by A to obtain the second frame 616B and so on, until frame 616N is obtained. Each frame can be fed into the audio encoder 502 to generate an audio feature vector of size M. As a result, the audio features 606 include N size-M vectors (or an N-by-M matrix). If the watermark is an audio signal, the watermark features can be generated similarly using the watermark encoder 504. That is, a feature vector can be generated for each frame of the watermark 604. The frame size of the watermark can be the same as or different from the frame size of the audio signal. If the feature vectors generated for the watermark have different dimensions than the audio features 606, the feature vectors can be expanded or otherwise transformed into the same dimension as the audio features 606 to obtain the watermark features 608. The watermark features 608 and the audio features 606 are combined to generate the watermarked audio features 610. In the example shown in FIG. 6, the combination is performed by concatenating the watermark features 608 and the audio features 606 along the horizontal direction. As a result, the watermarked audio features 610 include a N-by-2M matrix or N size-2M vectors.

Although FIG. 6 shows the combination of the watermark features 608 and the audio features 606 through concatenation, other ways to combine these two types of features can also be used. For example, the watermark features 608 and the audio features 606 can be summed or averaged to generate an N-by-M matrix as the watermarked audio features 610. Furthermore, while FIG. 6 shows the watermark 604 as a one-dimensional signal, such as an audio, other types of data can also be used as watermark 604. For instance, the watermark 604 can be a multi-digit number, a text, an image, and so on. The watermark encoder 504 may be constructed differently depending on the type of the watermark.

Referring back to FIG. 5, the watermark embedder 422 may further include an audio feature compressor 506 to compress the watermarked audio features 536 so as to reduce the network or storage resources used to transmit and store the watermarked audio signal. In some implementations, the feature compressor 506 is a quantizer that employs a vector quantization (VQ) algorithm. This algorithm effectively quantizes the watermarked audio features 536 to allow indices, which are much smaller than of the features themselves, to represent the watermarked audio features 536.

The audio reconstructor 408 shown in FIG. 5 includes an audio decoder 510 and an audio feature decompressor 508 if the audio feature compressor 506 is used in the watermark embedder 422. The audio feature decompressor 508 corresponds to the audio feature compressor 506 and is configured to decompress the watermarked audio features 536. The audio decoder 510 is configured to decode the watermarked audio features 536 into watermarked audio signal 538 in the temporal domain. In some implementations, the audio decoder 510 incorporates a multi-layer dilated convolutional layer configuration. The watermark extractor 412 is configured to extract the watermark 540 from the watermarked audio signal 538. The watermark extractor 412 can also be implemented as a multi-layer CNN.

In FIG. 5, the audio encoder 502, the watermark encoder 504, the audio decoder 510, and the watermark extractor 412 are trainable models. The training of the models can be performed by adjusting the parameters of the models to minimize a loss function. In some examples, the loss function L can be formulated as follows:

$$L=w_1l_1+w_2l_2+w_3l_3+w_4l_4. \quad (1)$$

Here, $l_i$s are the loss terms and wis are the weights of the loss terms. In some examples, $l_1$ is a term representing the difference between the original audio signal 522 and the watermarked audio signal 538 to ensure the watermarked audio signal 538 is perceptibly similar to the original audio signal 522. For instance, the difference can be measured as the difference between the Mel Spectrograms of the original audio signal 522 and the Mel Spectrograms of the watermarked audio signal 538.

$l_2$ can be a term representing the difference between the watermark 524 and the extracted watermark 540 to ensure the extracted watermark 540 is similar to the embedded watermark 524 thereby to ensure the robustness (detectability or recoverability) of the watermark 524. If the watermark is an audio signal, $l_2$ can be calculated in a similar way as $l_1$, for example, as the difference between the Mel Spectrograms of the watermark 524 and the Mel Spectrograms of the extracted watermark 540.

$w_3 l_3 + w_4 l_4$ can be a generative adversarial loss defined based on the original audio signal 522 and the watermarked audio signal 538 using a discriminator 512 to further improve the perceptual quality of the watermarked signal. For example, $l_3$ and $l_4$ can be defined as:

$$l_3 = E_{(x,s)}\left[(D(x)-1)^2 + (D(s))^2\right], \quad (2)$$

$$l_4 = E_s\left[(D(s)-1)^2\right]. \quad (3)$$

Here, x is the original audio signal 522; s is the watermarked audio signal 538; and E(y) is the expectation of y. D is the discriminator 512 which is configured to output 1 given x as the input and output 0 given s as the input. $l_3$ is used to ensure that the discriminator generates the correct output and $l_4$ is used to ensure that the watermarked audio signal s and the original audio signal x are the same to the discriminator D thereby to ensure the perceptual quality of the watermarked audio signal. The parameters of the discriminator D are also adjusted during the training. The trained models can be deployed to various devices as discussed above with respect to FIG. 4.

Figure 7:
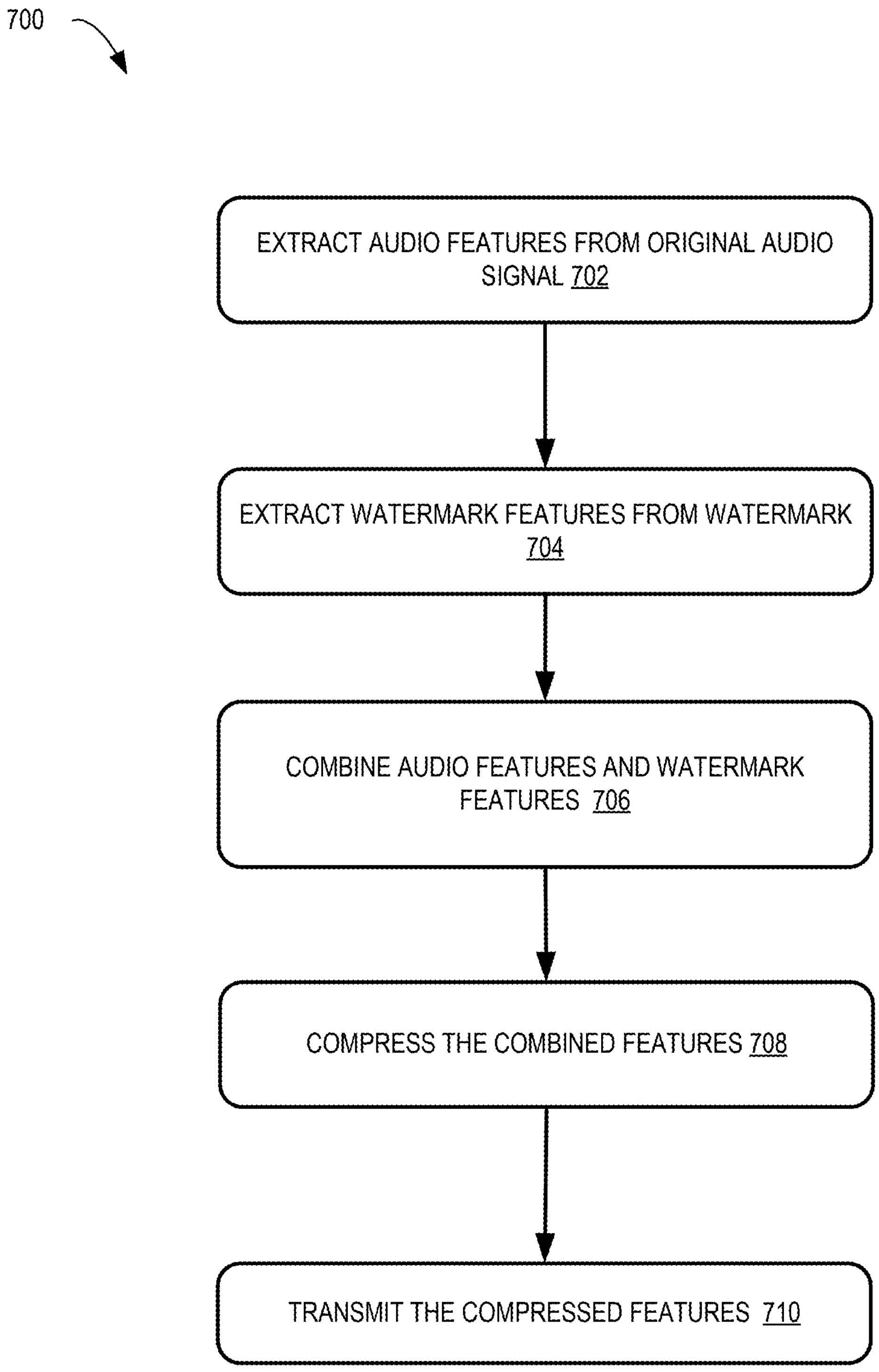
FIG. 7 shows a flowchart depicting a process for embedding a watermark to an original audio signal for videoconferencing, according to certain aspects of the present disclosure.

FIG. 7 shows a flowchart depicting a process 700 for embedding a watermark to an original audio signal for videoconferencing, according to certain aspects of the present disclosure. The client computing device 410 can be configured to implement operations depicted in FIG. 7 by executing suitable program code. The software or program code may be stored on a non-transitory storage medium (e.g., on a memory device). The process depicted in FIG. 7 and described below is intended to be illustrative and non-limiting. Although FIG. 7 depicts the various processing blocks occurring in a particular sequence or order, this is not intended to be limiting. In certain alternative embodiments, the blocks may be performed in some different order, or some blocks may also be performed in parallel. For illustrative purposes, the process 700 is described with reference to certain examples depicted in the figures. Other implementations, however, are possible.

At block 702, the process 700 involves extracting audio features from an original audio signal, such as an audio signal captured at a client computing device associated with a participant of a video conference. As discussed above in detail, the audio features can be extracted by inputting the audio signal to an audio encoder. The audio encoder can be a machine learning model, such as a multi-layer CNN. In some examples, the audio features include multiple feature vectors which are generated from overlapping frames of the original audio signal.

At block 704, the process 700 involves extracting, using a watermark encoder, watermark features from a watermark, such as an audio watermark, an image watermark, a text watermark, and so on. In examples where the watermark is also an audio signal, the watermark features can be extracted by extracting feature vectors from overlapping frames of the watermark in a way similar to the audio features. For other types of watermarks, the watermark encoder can be configured to take the watermark as input and output feature vectors each have the same dimension as the audio feature vector. If the number of the extracted feature vectors do not match the number of audio feature vectors, these feature vectors may be expanded or transformed to have the same number as the watermark features. The watermark encoder can be a machine learning model, such as a multi-layer convolutional neural network.

At block 706, the process 700 involves combining the audio features and the watermark features. The combination can be performed by concatenation, summation, averaging, and so on. At block 708, the process 700 involves compressing the combined features. In some examples, the compression is performed by quantization, such as vector quantization. As a result, the combined features can be represented by the indices of representative vectors of the vector quantization, thereby significantly reducing the size of the combined features.

At block 710, the process 700 involves transmitting the compressed features. The compressed features may be transmitted to the client computing devices of other participants of the video conference. In some examples, the compressed features are transmitted as a part of the audio stream of the video conference.

Figure 8:
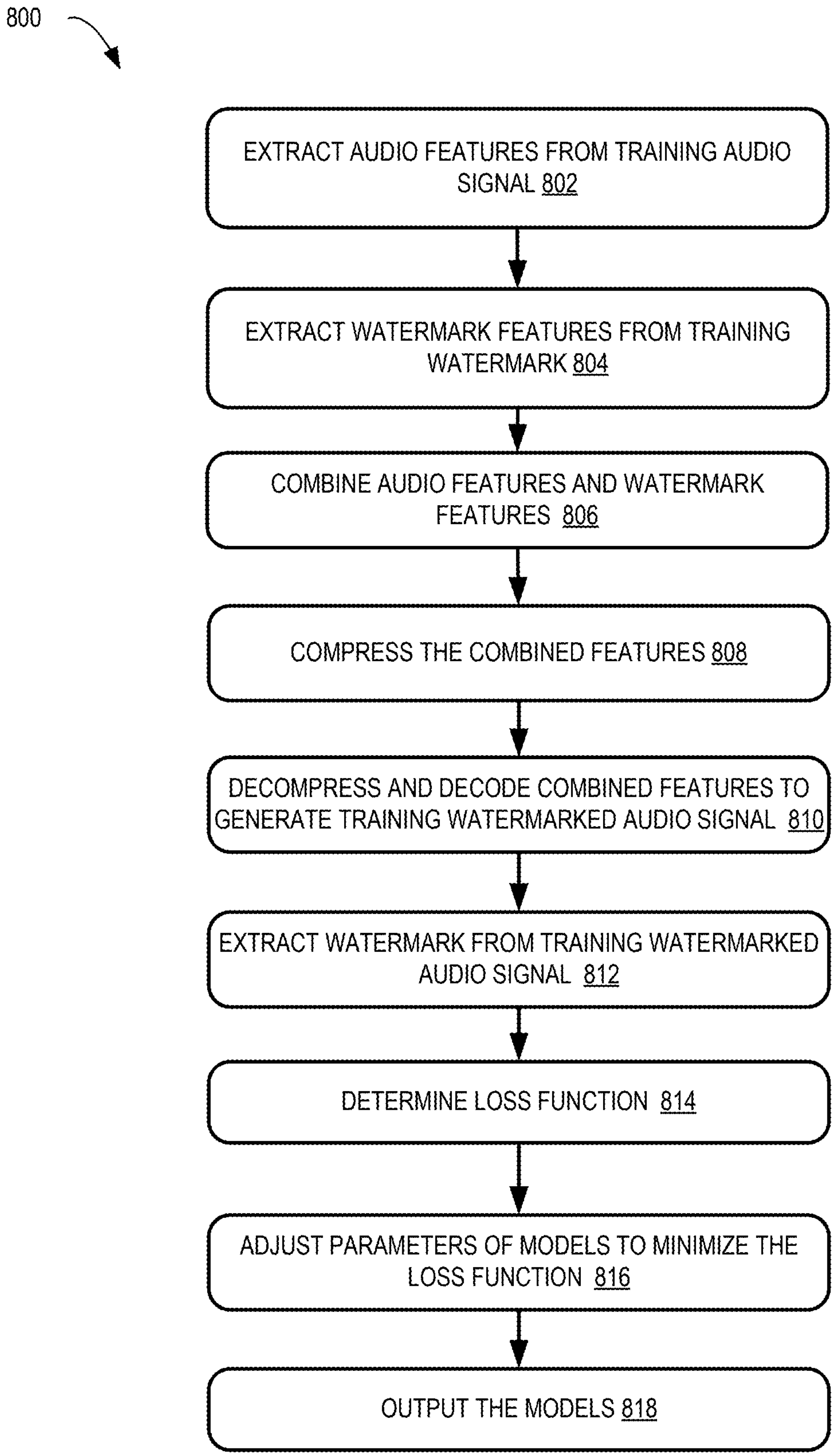
FIG. 8 shows a flowchart depicting a process for training machine learning models for audio watermarking, according to certain aspects of the present disclosure.

FIG. 8 shows a flowchart depicting a process 800 for training machine learning models for audio watermarking, according to certain aspects of the present disclosure. The operations depicted in FIG. 8 can be implemented by a computing device configured to train the models by executing suitable program code. The software or program code may be stored on a non-transitory storage medium (e.g., on a memory device). The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order, or some blocks may also be performed in parallel. For illustrative purposes, the process 800 is described with reference to certain examples depicted in the figures. Other implementations, however, are possible.

At block 802, the process 800 involves extracting audio features from a training audio signal using the audio encoder in a way similar to what is discussed above with respect to block 702. At block 804, the process 800 involves extracting watermark features from a training watermark using the watermark encoder in a way similar to what is discussed above with respect to block 704. At block 806, the process 800 involves combining the audio features and the watermark features. The combination can be performed by concatenation, summation, averaging, and so on. At block 808, the process 800 involves compressing the combined features such as through vector quantization.

At block 810, the process 800 involves decompressing the combined features (e.g., through vector decompression) and decoding the combined features using the audio decoder to generate training watermarked audio signal. At block 812, the process 800 involves extracting the watermark from the training watermarked audio signal as discussed above. Blocks 802-812 can be repeated for other training audio signals and watermarks. At block 814, the process 800 involves determining a loss function based on the training audio signals, training watermarks, training watermarked audio signals, and extracted watermarks. For example, the loss function can be defined according to Eq. (1) discussed above. At block 816, the process 800 involves adjusting the parameters of the models involved above to minimize the loss function, for example, using the gradient descent algorithm. At block 818, the process 800 involves outputting the models for use in various applications, such as copyright protection, content authentication, ownership verification, and so on.

While the above description focuses on compressing the watermarked audio features through quantization for transmission, other implementations may be possible. For example, instead of compressing and transmitting the watermarked audio features, the client computing device can apply the audio decoder to the watermarked audio features to reconstruct the watermarked audio signal at the client computing device. The watermarked audio signal can then be compressed as usual for transmission. For example, the audio compression mechanisms such as MPEG Audio Layer 3 (MP3) can be used to convert the watermarked audio signal into a binary bitstream for transmission. In this way, the receiving client computing device can decompress the binary bitstream to reconstruct the watermarked audio signal without using the audio decoder.

Furthermore, during the training, distortions can be applied to the watermarked audio signals before the watermark is extracted by the watermark extractor. The distortion can include, for example, noises, compression, low-pass filters, band-pass filters, and so on. In this way, the robustness of the embedded watermark can be increased. As discussed above, the audio feature compressor and the audio feature decompressor are optional and thus can be kept or removed during the training.

Figure 9:
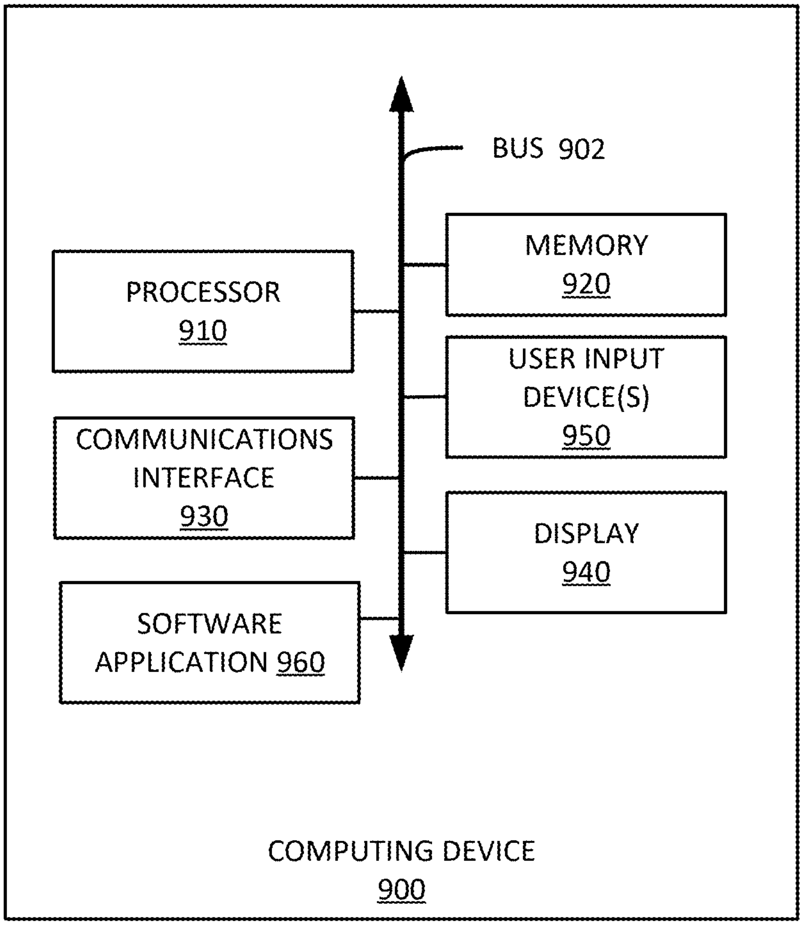
FIG. 9 shows an example computing device suitable for performing certain aspects of the present disclosure.

Referring now to FIG. 9, FIG. 9 shows an example computing device 900 suitable for performing certain aspects of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more processes described herein, such as part or all of the example process 700 described above with respect to FIG. 7, part or all of the example process 800 described above with respect to FIG. 8. For example, the software application 960 provided on the computing device 900 may provide instructions for performing one or more steps of the process 700 or process 800. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example #1: a method performed by a computing device, the method comprising: accessing an original audio signal and a watermark to be embedded into the original audio signal; extracting, using an audio encoder, a set of audio features from the original audio signal, wherein the audio encoder is a first machine learning model; extracting, using a watermark encoder, a set of watermark features from the watermark, wherein the watermark encoder is a second machine learning model; combining the set of audio features and the set of watermark features to generate a set of features; compressing the set of features; and transmitting the compressed set of features.

Example #2: the method of Example #1, wherein the audio encoder and the watermark encoder are trained via a training process, the training process comprising: generating training audio features by applying the audio encoder on a training original audio signal; generating training watermark features by applying the watermark encoder on a training watermark; combining the training watermark features with the training audio features to generate combined training features; generating a training watermarked audio signal by applying an audio decoder on the combined training features; generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

Example #3: the method of Examples #1-2, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

Example #4: the method of Examples #1-3, wherein the processed training watermarked audio signal is generated by applying on the training watermarked audio signal one or more of additive noise, compression, or a low pass filter.

Example #5: the method of Examples #1-4, wherein at least one of the audio encoder, the watermark encoder, the audio decoder, or the watermark extractor is a neural network model.

Example #6: the method of Examples #1-5, wherein compressing the set of features comprises quantizing the set of features using vector quantization, and wherein the compressed set of features comprise indices of individual features in the set of features.

Example #7: the method of Examples #1-6, further comprising: receiving a second compressed set of features; decompressing the second compressed set of features to generate a second set of features; generating a watermarked audio signal by applying an audio decoder on the second set of features; and playing the watermarked audio signal.

Example #8: the method of Examples #1-7, wherein the watermark is one or more of an audio signal, an image, a text, or a number.

Example #9: a computing device, comprising: a non-transitory computer-readable medium; and a processor communicatively coupled to the non-transitory computer-readable medium, the processor configured to execute processor-executable instructions stored in the non-transitory computer-readable medium to: access an original audio signal and a watermark to be embedded into the original audio signal; extract, using an audio encoder, a set of audio features from the original audio signal, wherein the audio encoder is a first machine learning model; extract, using a watermark encoder, a set of watermark features from the watermark, wherein the watermark encoder is a second machine learning model; combine the set of audio features and the set of watermark features to generate a set of features; compress the set of features; and transmit the compressed set of features.

Example #10: the computing device of Examples #9, wherein the audio encoder and the watermark encoder are trained via a training process, the training process comprising: generating training audio features by applying the audio encoder on a training original audio signal; generating training watermark features by applying the watermark encoder on a training watermark; combining the training watermark features with the training audio features to generate combined training features; generating a training watermarked audio signal by applying an audio decoder on the combined training features; generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

Example #11: the computing device of Examples #9-10, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

Example #12: the computing device of Examples #9-11, wherein the processed training watermarked audio signal is generated by applying on the training watermarked audio signal one or more of additive noise, compression, or a low pass filter.

Example #13: the computing device of Examples #9-12, wherein at least one of the audio encoder, the watermark encoder, the audio decoder, or the watermark extractor is a neural network model.

Example #14: the computing device of Examples #9-13, wherein compressing the set of features comprises quantizing the set of features using vector quantization, and wherein the compressed set of features comprise indices of individual features in the set of features.

Example #15: the computing device of Examples #9-14, further comprising: receiving a second compressed set of features; decompressing the second compressed set of features to generate a second set of features; generating a watermarked audio signal by applying an audio decoder on the second set of features; and playing the watermarked audio signal.

Example #16: a non-transitory computer-readable medium comprising processor-executable instructions configured to cause one or more processors to: access an original audio signal and a watermark to be embedded into the original audio signal; extract, using an audio encoder, a set of audio features from the original audio signal, wherein the audio encoder is a first machine learning model; extract, using a watermark encoder, a set of watermark features from the watermark, wherein the watermark encoder is a second machine learning model; combine the set of audio features and the set of watermark features to generate a set of features; compress the set of features; and transmit the compressed set of features.

Example #17: the non-transitory computer-readable medium of Example #16, wherein the audio encoder and the watermark encoder are trained via a training process, the training process comprising: generating training audio features by applying the audio encoder on a training original audio signal; generating training watermark features by applying the watermark encoder on a training watermark; combining the training watermark features with the training audio features to generate combined training features; generating a training watermarked audio signal by applying an audio decoder on the combined training features; generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

Example #18: the non-transitory computer-readable medium of Examples #16-17, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

Example #19: the non-transitory computer-readable medium of Examples #16-18, wherein the processed training watermarked audio signal is generated by applying on the training watermarked audio signal one or more of additive noise, compression, or a low pass filter.

Example #20: the non-transitory computer-readable medium of Examples #16-19, wherein compressing the set of features comprises quantizing the set of features using vector quantization, and wherein the compressed set of features comprise indices of individual features in the set of features.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method performed by a computing device, the method comprising:

accessing an original audio signal and a watermark to be embedded into the original audio signal;

extracting, using an audio encoder, a set of audio features from the original audio signal, wherein the audio encoder is a first machine learning model;

extracting, using a watermark encoder, a set of watermark features from the watermark, wherein the watermark encoder is a second machine learning model;

combining the set of audio features and the set of watermark features to generate a set of features;

compressing the set of features; and transmitting the compressed set of features.

2. The method of claim 1, wherein the audio encoder and the watermark encoder are trained via a training process, the training process comprising:

generating training audio features by applying the audio encoder on a training original audio signal;

generating training watermark features by applying the watermark encoder on a training watermark;

combining the training watermark features with the training audio features to generate combined training features;

generating a training watermarked audio signal by applying an audio decoder on the combined training features;

generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

3. The method of claim 2, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

4. The method of claim 2, wherein the processed training watermarked audio signal is generated by applying on the training watermarked audio signal one or more of additive noise, compression, or a low pass filter.

5. The method of claim 2, wherein at least one of the audio encoder, the watermark encoder, the audio decoder, or the watermark extractor is a neural network model.

6. The method of claim 1, wherein compressing the set of features comprises quantizing the set of features using vector quantization, and wherein the compressed set of features comprise indices of individual features in the set of features.

7. The method of claim 1, further comprising:

receiving a second compressed set of features;

decompressing the second compressed set of features to generate a second set of features;

generating a watermarked audio signal by applying an audio decoder on the second set of features; and playing the watermarked audio signal.

8. The method of claim 1, wherein the watermark is one or more of an audio signal, an image, a text, or a number.

9. A computing device, comprising:

a non-transitory computer-readable medium; and a processor communicatively coupled to the non-transitory computer-readable medium, the processor configured to execute processor-executable instructions stored in the non-transitory computer-readable medium to:

access an original audio signal and a watermark to be embedded into the original audio signal;

extract, using an audio encoder, a set of audio features from the original audio signal, wherein the audio encoder is a first machine learning model;

extract, using a watermark encoder, a set of watermark features from the watermark, wherein the watermark encoder is a second machine learning model;

combine the set of audio features and the set of watermark features to generate a set of features;

compress the set of features; and transmit the compressed set of features.

10. The computing device of claim 9, wherein the audio encoder and the watermark encoder are trained via a training process, the training process comprising:

generating training audio features by applying the audio encoder on a training original audio signal;

generating training watermark features by applying the watermark encoder on a training watermark;

combining the training watermark features with the training audio features to generate combined training features;

generating a training watermarked audio signal by applying an audio decoder on the combined training features;

generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

11. The computing device of claim 10, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

12. The computing device of claim 10, wherein the processed training watermarked audio signal is generated by applying on the training watermarked audio signal one or more of additive noise, compression, or a low pass filter.

13. The computing device of claim 10, wherein at least one of the audio encoder, the watermark encoder, the audio decoder, or the watermark extractor is a neural network model.

14. The computing device of claim 9, wherein compressing the set of features comprises quantizing the set of features using vector quantization, and wherein the compressed set of features comprise indices of individual features in the set of features.

15. The computing device of claim 9, wherein the processor is configured to execute further processor-executable instructions stored in the non-transitory computer-readable medium to:

receive a second compressed set of features;

decompress the second compressed set of features to generate a second set of features;

generate a watermarked audio signal by applying an audio decoder on the second set of features; and play the watermarked audio signal.

16. A non-transitory computer-readable medium comprising processor-executable instructions configured to cause one or more processors to:

access an original audio signal and a watermark to be embedded into the original audio signal;

extract, using an audio encoder, a set of audio features from the original audio signal, wherein the audio encoder is a first machine learning model;

extract, using a watermark encoder, a set of watermark features from the watermark, wherein the watermark encoder is a second machine learning model;

combine the set of audio features and the set of watermark features to generate a set of features;

compress the set of features; and transmit the compressed set of features.

17. The non-transitory computer-readable medium of claim 16, wherein the audio encoder and the watermark encoder are trained via a training process, the training process comprising:

generating training audio features by applying the audio encoder on a training original audio signal;

generating training watermark features by applying the watermark encoder on a training watermark;

combining the training watermark features with the training audio features to generate combined training features;

generating a training watermarked audio signal by applying an audio decoder on the combined training features;

generating an extracted training watermark by applying a watermark extractor on the training watermarked audio signal or a processed training watermarked audio signal; and adjusting parameters of the audio encoder, the watermark encoder, the audio decoder, and the watermark extractor to minimize a loss function.

18. The non-transitory computer-readable medium of claim 17, wherein the loss function comprises a first term representing a difference between the training original audio signal and the training watermarked audio signal, a second term representing a difference between the training watermark and the extracted training watermark, and a third term representing a generative adversarial loss defined based on the training original audio signal and the training watermarked audio signal.

19. The non-transitory computer-readable medium of claim 17, wherein the processed training watermarked audio signal is generated by applying on the training watermarked audio signal one or more of additive noise, compression, or a low pass filter.

20. The non-transitory computer-readable medium of claim 16, wherein compressing the set of features comprises quantizing the set of features using vector quantization, and wherein the compressed set of features comprise indices of individual features in the set of features.

* * * * *